United States Patent [19]

Izawa et al.

[11] Patent Number: 5,444,658
[45] Date of Patent: Aug. 22, 1995

[54] ELASTIC STORE MEMORY CIRCUIT

[75] Inventors: Naoyuki Izawa, Mitaka; Yasuhiro Aso, Tokyo; Yoshihiro Uchida; Satoshi Kakuma, both of Kawasaki, all of Japan

[73] Assignee: Fujitsu Limited, Kawasaki, Japan

[21] Appl. No.: 206,221

[22] Filed: Mar. 7, 1994

Related U.S. Application Data

[63] Continuation of Ser. No. 959,459, Oct. 9, 1992, abandoned, which is a continuation of Ser. No. 553,556, Jul. 18, 1990, abandoned.

[30] Foreign Application Priority Data

Jul. 18, 1989 [JP] Japan ............................. 1-184991

[51] Int. Cl.⁶ .............................................. G11C 7/00
[52] U.S. Cl. ........................ 365/189.07; 365/189.02; 365/129.04; 365/221; 365/233; 365/236; 365/194; 365/230.05
[58] Field of Search ................. 365/189.02, 189.04, 365/189.02, 189.05, 189.07, 221, 233, 236, 194, 230.05

[56] References Cited

U.S. PATENT DOCUMENTS

| | | |
|---|---|---|
| 3,867,579 | 4/1975 | Colton et al. |
| 3,928,726 | 12/1975 | Colton et al. |
| 4,171,538 | 10/1979 | Sheller ........................... 365/236 |
| 4,287,577 | 9/1981 | Deal .................................. 365/233 |
| 4,307,462 | 12/1981 | Mazzocchi . |
| 4,423,493 | 12/1983 | Annecke ........................... 365/233 |
| 4,819,208 | 4/1989 | Nakabayashi et al. ............ 365/221 |

FOREIGN PATENT DOCUMENTS

| | | |
|---|---|---|
| 60-254938 | 12/1985 | Japan . |
| 61-90542 | 5/1986 | Japan . |
| 1-296486 | 11/1989 | Japan .......................... 365/230.05 |
| 2071372 | 9/1981 | United Kingdom ............. 365/236 |

*Primary Examiner*—Joseph E. Clawson, Jr.
*Attorney, Agent, or Firm*—Staas & Halsey

[57] ABSTRACT

An elastic store memory circuit includes first and second elastic store memories. Each of the first and second elastic store memories generates a phase comparison signal when a phase difference between a write timing and a read timing is within a predetermined phase range. The elastic store memory circuit also includes a selector which selects either the input data read out from the first elastic store memory or the input data read out from the second elastic store memory, and a slip signal generator for generating a slip signal on the basis of a write reset timing at which the first and second elastic store memories are reset, a read reset timing at which the first and second elastic store memories are reset, and the phase comparison signal. The slip signal indicates which one of the write reset timing and the read reset timing precedes the other one.

12 Claims, 9 Drawing Sheets

ELASTIC STORE MEMORY CIRCUIT

This application is a continuation of application No. 07/959,459, filed Oct. 9, 1992, now abandoned, which is a continuation of No. 07/553,556, filed Jul. 18, 1990, now abandoned.

BACKGROUND OF THE INVENTION

The present invention generally relates to an elastic store memory circuit, and more particularly to an elastic store memory circuit which generates a signal indicative of the type of data slip which takes place during read operation.

In the field of communications, there is a trend to process signals in digital form. For example, analog signals such as voice signals are converted into digital signals. In order to transmit digital signals, digital signals are multiplexed and/or converted into transmission signals having bit rates different from those of the digital signals. The transmission signals thus obtained are sent to receive devices through transmission paths. On the receive side, transmission signals are demultiplexed and/or converted to digital signals having the original bit rates.

Conventionally, an elastic store memory is used for realizing a multiplexing/demultiplexing procedure or a bit rate conversion procedure. As is well known, an elastic store memory executes the write operation and read operation simultaneously and asynchronously. Input data is written into the elastic store memory at the bit rate of the input data, while data is read out therefrom at a desired bit rate.

Referring to FIG. 1, there is shown a transmission system, which includes a plurality of data transmission terminals (DT) 31, a data terminal controller (DTC) 32 and a network (NW) 33. The data transmission terminals 31 are respectively provided with a plurality of transmission lines 30. Each of the data transmission terminals 31 asynchronously receives a data signal (such as a digitized voice signal or an information signal) in a predetermined frame format, and converts the same into a synchronized signal. The data terminal controller 32 receives the synchronized signals output by the data transmission terminals 31 and multiplexes the same to thereby generate a transmission signal. The network 33 receives the transmission signal produced and output by the data terminal controller 32, and sends the same to the data terminal controller 32 by a switching procedure. The data terminal controller 32 carries out a procedure for demultiplexing the received transmission signal, and sends demultiplexed signals to the data transmission terminals 31.

Each of the data transmission terminals 31 converts the asynchronous input data signal into the digitized signal which is in synchronism with a synchronizing signal having a bit rate suitable for multiplexing. For this purpose, each of the data transmission terminals 31 is provided with an elastic store memory in which the write operation is performed separately from the read operation.

FIG. 2 is a diagram illustrating a conventional elastic store memory. The elastic store memory shown in FIG. 2 has addresses, 00 to 0N where N is arbitrary number. The write operation and the read operation are separately carried out in the increasing order of address. After the address 0N is processed, address 00 is processed. Signals used on the write side of the elastic store memory are a clock 1, input data (write data), a write inhibit signal and a write reset signal. When the write reset signal produced and output by a write control circuit (not shown) is applied to the elastic store memory, the write address is set to be address 00. Signals used on the read side of the elastic memory are a clock 2, output data (read data), a read inhibit signal, a read reset signal and a phase comparison signal (hereinafter simply referred to as a PCO signal). The read reset signal is generated and output by a read control circuit (not shown). When the read reset signal is applied to the elastic store memory, the read address is set to address 00.

The elastic store memory recognizes that readout data is correct during the time when data is successively read out from a storage area specified by an address to which the writing of input data is already completed. When the bit rate of the read operation is greater than that of the write operation, there is a possibility that data related to an address for which the writing of new (next) input data has not yet been carried out is read out from a storage area specified by the above address. In other words, the same data is twice read out from the same storage area. On the other hand, when the bit rate of the read operation is less than that of the write operation, there is a possibility that before data is read out from a storage area, new input data is written into the above storage area. In this case, the above data which has not yet been read out is lost. The above-mentioned re-reading of data and lack of data is defined as a slip of data or data slip.

A phase comparator built in the elastic store memory compares the phase of the write reset signal and the phase of the read reset signal and determines whether or not the phase difference is small so that there is a possibility that the slip of data occurs. When the determination result is affirmative, the elastic store memory generates the PCO signal.

FIG. 3 is a waveform diagram illustrating how to generate the PCO signal. In FIG. 3, each of the clock signals 1 and 2 has an identical bit rate for the sake of simplicity. With respect to the write reset signal, $(n-1)$ bits of the read reset signal before the write reset signal and $(n+1)$ bits thereof after the same form an alarm area. If the read reset signal appears within the alarm area, the PCO signal (also called PCO alarm) is generated. The numeral n is set in the phase comparator provided in the elastic store memory. For example, $n=2, 4, 8$ or $16$. For $n=2$, one bit of the read reset signal before the write reset signal and three bits thereof after the same form the alarm area.

The PCO signal is sent to a destination terminal together with readout data. The destination terminal can acknowledge the occurrence of the slip of data from the PCO signal. However, the destination terminal cannot understand the cause of the occurrence of data slip from the PCO signal. That is, the destination terminal cannot understand, from the PCO signal, whether the occurrence of data slip arises from the re-reading of data or the lack of data.

SUMMARY OF THE INVENTION

It is a general object of the present invention to provide an improved elastic store memory circuit in which the above-mentioned disadvantages are eliminated.

A more specific object of the present invention is to provide an elastic store memory circuit which generates a signal indicating the cause of the occurrence of data slip.

The above-mentioned objects of the present invention are achieved by an elastic store memory circuit comprising a first elastic store memory, a second elastic store memory, where input data are alternately written into the first and second elastic store memories, the input data being read out from the first and second elastic store memories at the same time. Each of the first and second elastic memories generate a phase comparison signal when a phase difference between a write timing and a read timing is within a predetermined phase range, the input data being written into and read out from the first and second elastic store memories at the write timing and the read timing, respectively. Also a selecting means, coupled to the first and second elastic store memories, selects either the input data read out from the first elastic store memory or the input data read out from the second elastic store memory, and a slip signal generating means, coupled to the one of the first and second elastic store memories, generates a slip signal on the basis of a write reset timing at which the first and second elastic store memories are reset, a read reset timing at which the first and second elastic store memories are reset, and the phase comparison signal. The slip signal indicates which one of the write reset timing and the read reset timing precedes the other one.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 4:
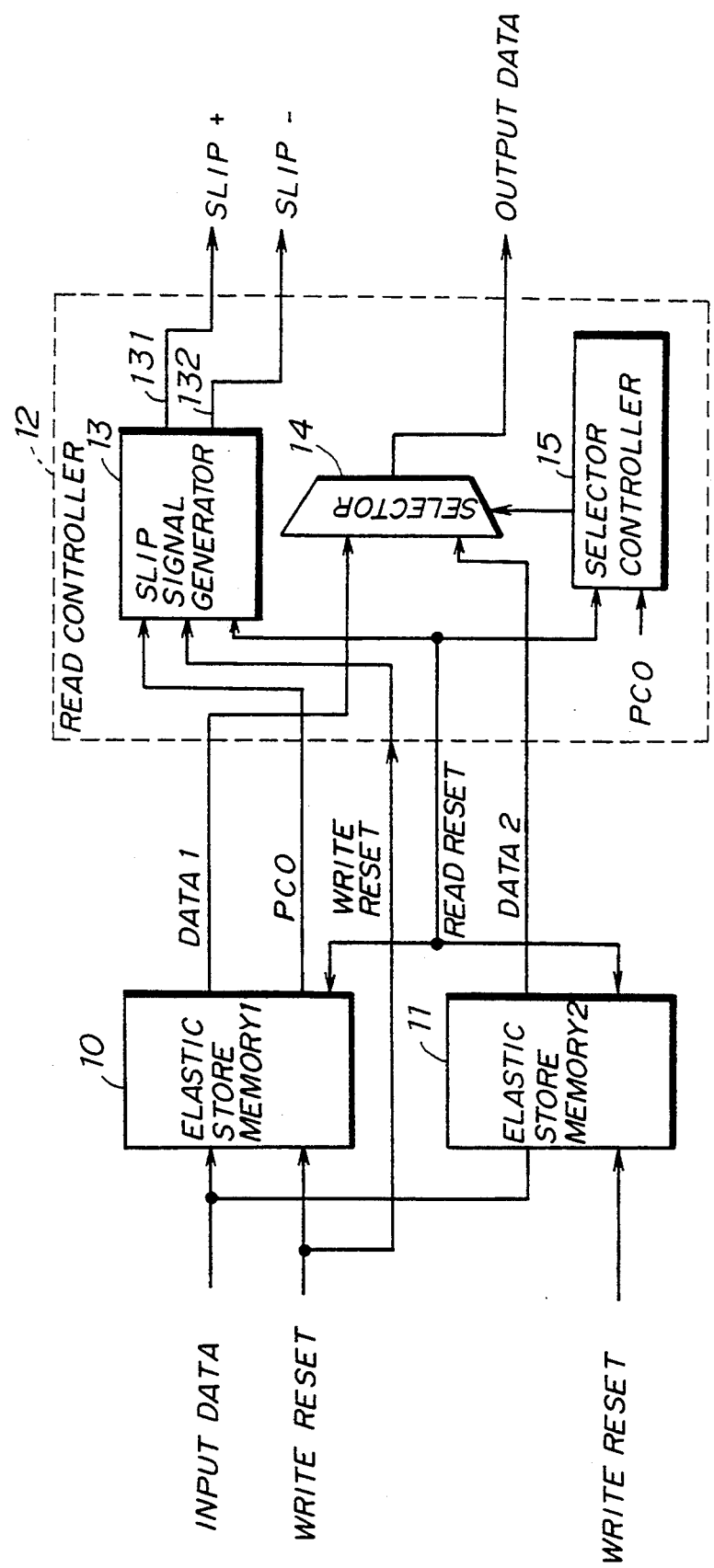
FIG. 4 is a block diagram of an elastic store memory circuit according to the present invention.

A description will now be given of a basic configuration of the elastic store memory circuit according to the present invention with reference to FIG. 4. The elastic store memory circuit shown in FIG. 4 is composed of elastic store memories 10 and 11, and a read controller 12 coupled to the elastic store memories 10 and 11. The read controller 12 is made up of a slip signal generator 13, a selector 14 and a selector controller 15. The write reset signal generated by the write control circuit (not shown) is input to the elastic store memories 10 and 11 and the slip signal generator 13. The read reset signal generated within the read controller 12 is applied to the slip signal generator 13 and the elastic store memories 10 and 11.

Input data is alternately written into the elastic store memories 10 and 11 for every frame. A frame is a unit of multiplexed data. The input data is alternately written into the elastic store memories 10 and 11 at a bit rate of the input data, starting from the beginning address (00) of the elastic store memories 10 and 11. Under the control of the read controller 12, data are simultaneously read out from the elastic store memories 10 and 11 at a bit rate which corresponds to a processing speed of a destination terminal or a next-stage device.

Data 1 and 2 which are respectively read out from the elastic store memories 10 and 11 at the same time are sent to the selector 14 of the read controller 12. In accordance with a select signal generated and output by the selector controller 15, the selector 14 selects either data 1 from the elastic store memory 10 or data 2 from the elastic store memory 11. The selector controller 15 generates the select signal from the read reset signal and the PCO signal which is supplied from one of the elastic store memories 10 and 11. Data selected by the selector 14 is sent, as output data, to the destination terminal or next-stage device.

The slip signal generator 13 receives the PCO signal, the write reset signal and the read reset signal, and determines which one of the write operation and the read operation precedes on the basis of the write reset signal and the read reset signal when the PCO signal is received. When it is determined that the read reset signal precedes the write reset signal, the slip signal generator 13 generates a signal 131 (SLIP+). On the other hand, when it is determined that the write reset signal precedes the read reset signal, the slip signal generator 13 generates a signal 132 (SLIP−). The slip signal 131 and 132 are sent to the destination terminal or the circuit of the next stage together with the output data. When the slip signal 131 is generated, the circuit of the next stage can conclude that the received output data is unnecessary.

Figure 5:
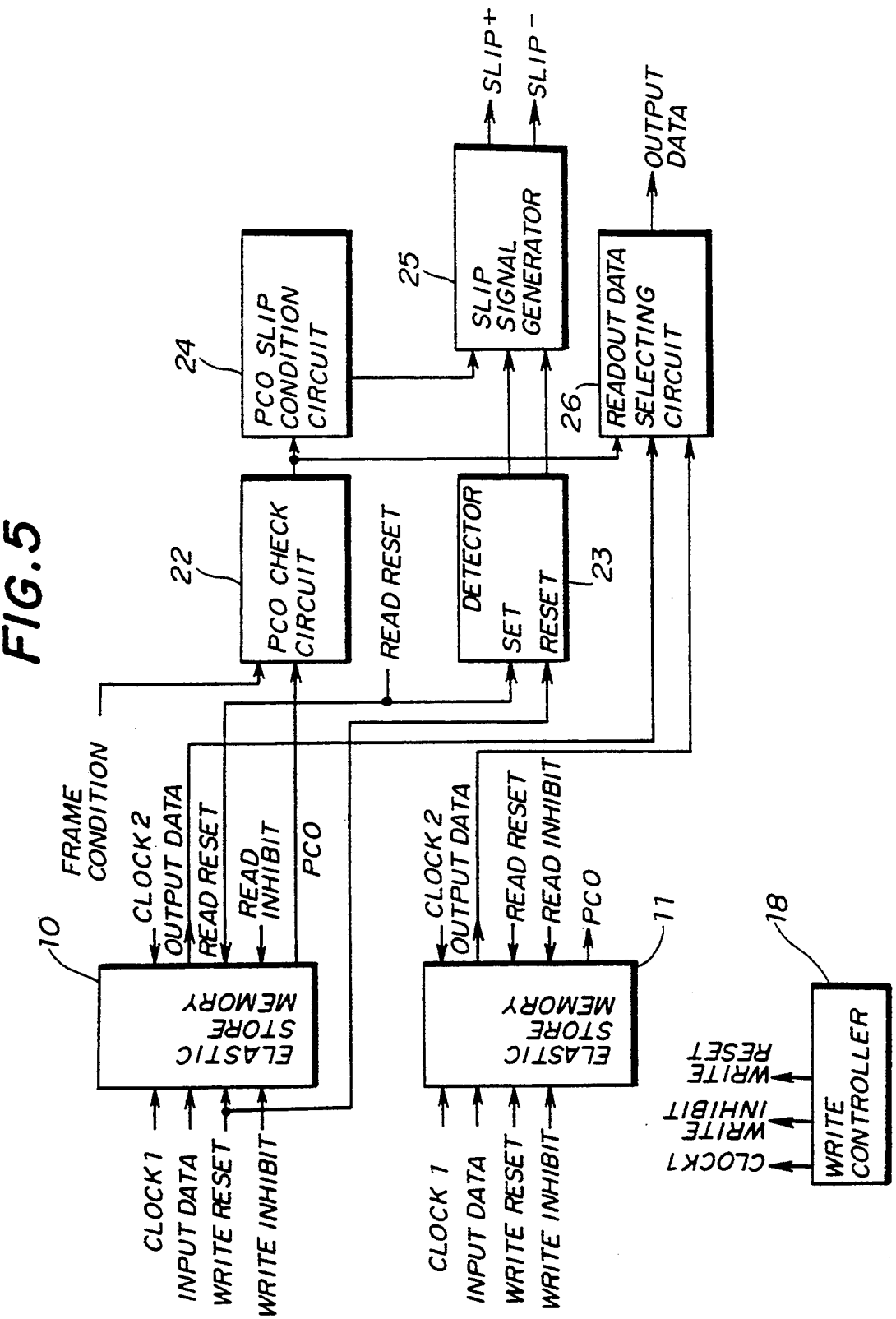
FIG. 5 is a block diagram of an elastic store memory circuit according to a preferred embodiment of the present invention.

A description will now be given of a more detailed configuration of the elastic store memory circuit shown in FIG. 4 with reference to FIG. 5. In FIG. 5, those parts which are the same as those shown in FIG. 4 are given the same reference numerals. Referring to FIG. 5, a PCO check circuit 22, a detector 23, a PCO slip condition circuit 24, a slip signal generator circuit 25 and a readout data selecting circuit 26 form the read controller 12 shown in FIG. 4.

The slip signal generator 13 corresponds to the PCO check circuit 22, the detector 23, the PCO slip condition circuit 24 and the slip signal generator 25. The selector 14 corresponds to the readout data selecting circuit 26. The selector controller 15 corresponds to the PCO check circuit 22.

Input data such as voice data is alternately written into the elastic store memories 10 and 11 for every frame. When voice data amounts to 24 lines and one time slot consists of 8 bits, one frame consists of 192 bits ($=24 \times 8$ bits). During the write operation, input data is written, for every 8 bits (corresponding to one time slot), into a storage area of either the elastic store memory 10 or 11 in synchronism with the clock 1. When the writing of input data amounting to one frame is completed, the other elastic store memory is selected by a conventional write controller 18. During the time when the write inhibit signal is applied to the elastic store memories 10 or 11, the writing of input data is inhibited.

Data are read out from the elastic store memories 10 and 11 in synchronism with the clock 2 at the same time. The readout data from the elastic store memories 10 and 11 are sent to the read data selecting circuit 26, which selects the data sent from one of the elastic store memories 10 and 11.

Figure 1:
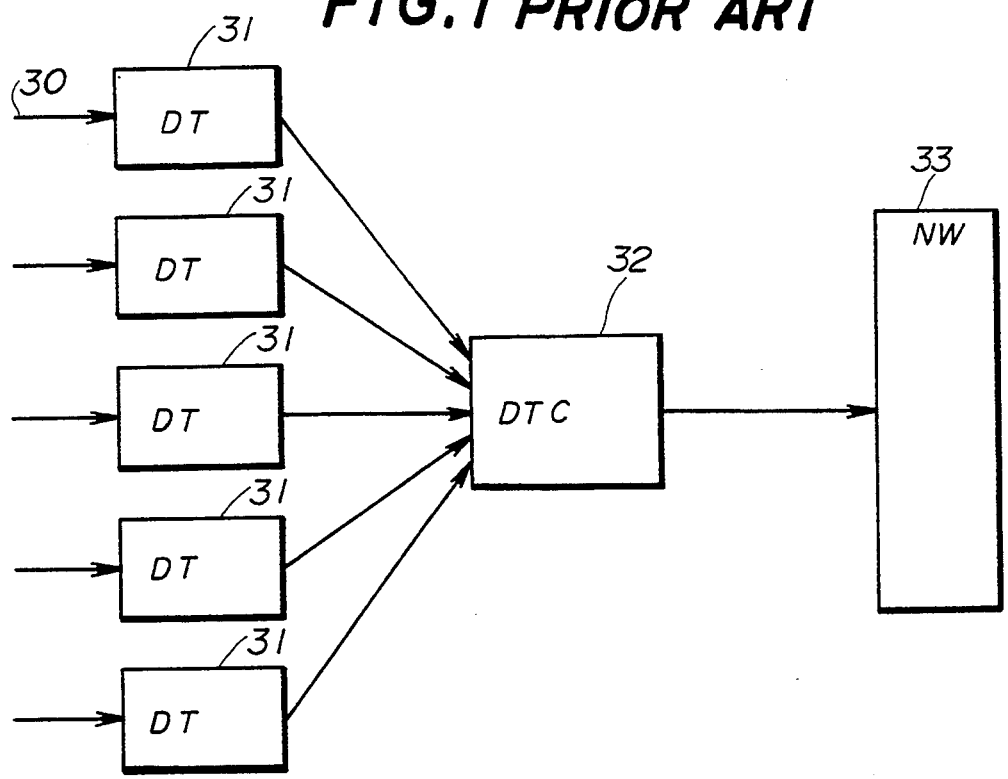
FIG. 1 is a data transmission system to which an elastic store memory is applied.
Figure 2:
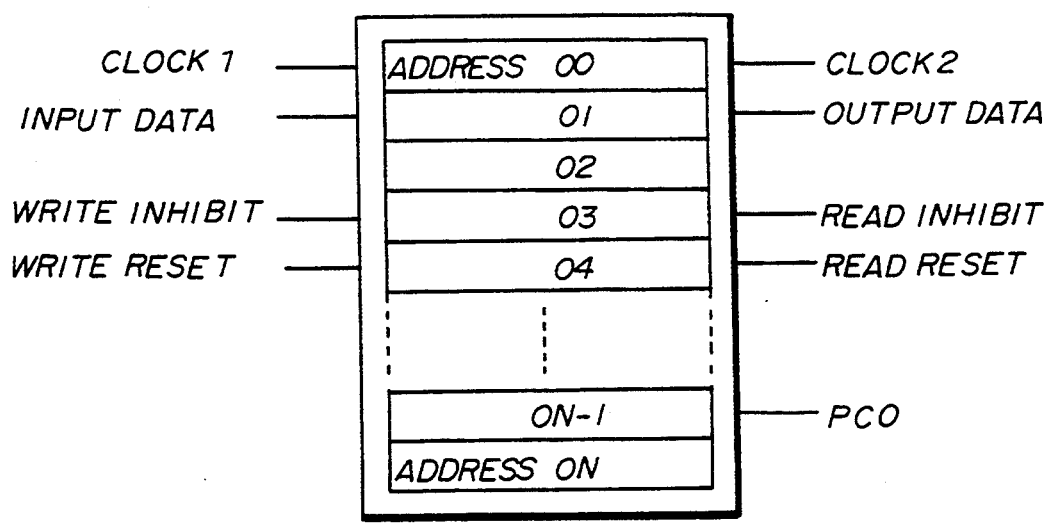
FIG. 2 is a diagram showing a conventional elastic store memory.
Figure 3:
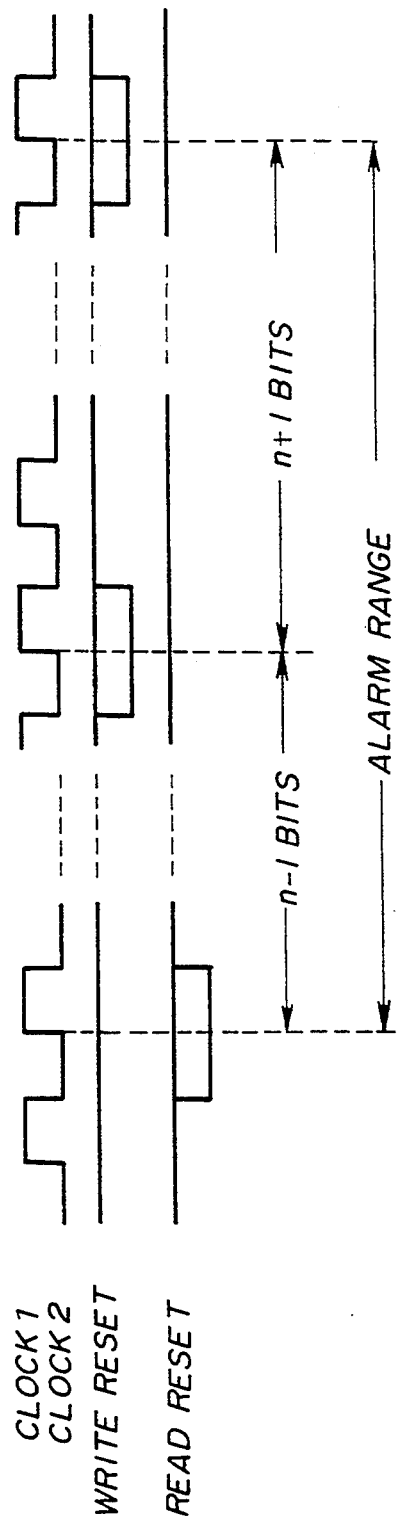
FIG. 3 is a waveform diagram illustrating how a PCO signal is generated.

Each of the elastic store memories 10 and 11 has a phase comparator (not shown), which compares the phase of the write reset signal with the phase of the read reset signal. As has been described previously with reference to FIG. 3, when the phase difference between the write reset signal and the read reset signal is within a predetermined range, the phase comparator generates the PCO signal. One of the PCO signals generated and output by the elastic store memories 10 and 11 is input to the PCO check circuit 22. In FIG. 5, the PCO signal generated and output by the elastic store memory 10 is used.

The PCO check circuit 22, which is formed of, for example, a flip-flop, is supplied with a frame condition which indicates a timing corresponding to a boundary of two consecutive frames. The PCO check circuit 22 determines, for every frame, whether or not the PCO signal is generated within one frame. When the result is affirmative, that is, when the PCO check circuit 22 receives the PCO signal, the PCO check circuit 22 generates an output signal, which is input to the PCO slip condition circuit 24 and the readout data selecting circuit 26.

The detector 23 is formed of, for example, a flip-flop, and determines which one of the reset signals precedes the other. The detector 23 is set by the read reset signal and reset by the write reset signal. A set signal that is generated when the detector 23 is set, and a reset signal that is generated when the detector 23 is reset are sent to the slip signal generator 25.

The PCO slip condition circuit 24 generates a drive signal when receiving the output signal from PCO check circuit 22. The slip signal generator 25 is driven by the drive signal generated and output by the PCO slip condition circuit 24. When receiving the set signal which indicates that the read reset signal precedes the write reset signal, the slip signal generator 25 generates a first slip signal SLIP+. On the other hand, the slip signal generator 25 generates a second slip signal SLIP−, when receiving the reset signal which indicates the write reset signal precedes the read reset signal. The slip signal SLIP+ indicates that the same data amounting to one frame is read out again. The slip signal SLIP− indicates that data amounting to one frame is lost.

The readout data selecting circuit 26 selects either data read out from the elastic store memory 10 or data from the elastic store memory 11. Normally, the image data are alternately selected. However, when receiving the output signal from the PCO check circuit 22, the readout data selecting circuit 26 operates as follows. When the readout data selecting circuit 26 receives the output signal from the PCO check circuit 22 (for example, the output level of the PCO check circuit 22 is changed to "1" from "0"), the readout data selecting circuit 26 selects the immediately previous data (which is read out from the other elastic store memory) so that the same data amounting to one frame is output twice.

Figure 6:
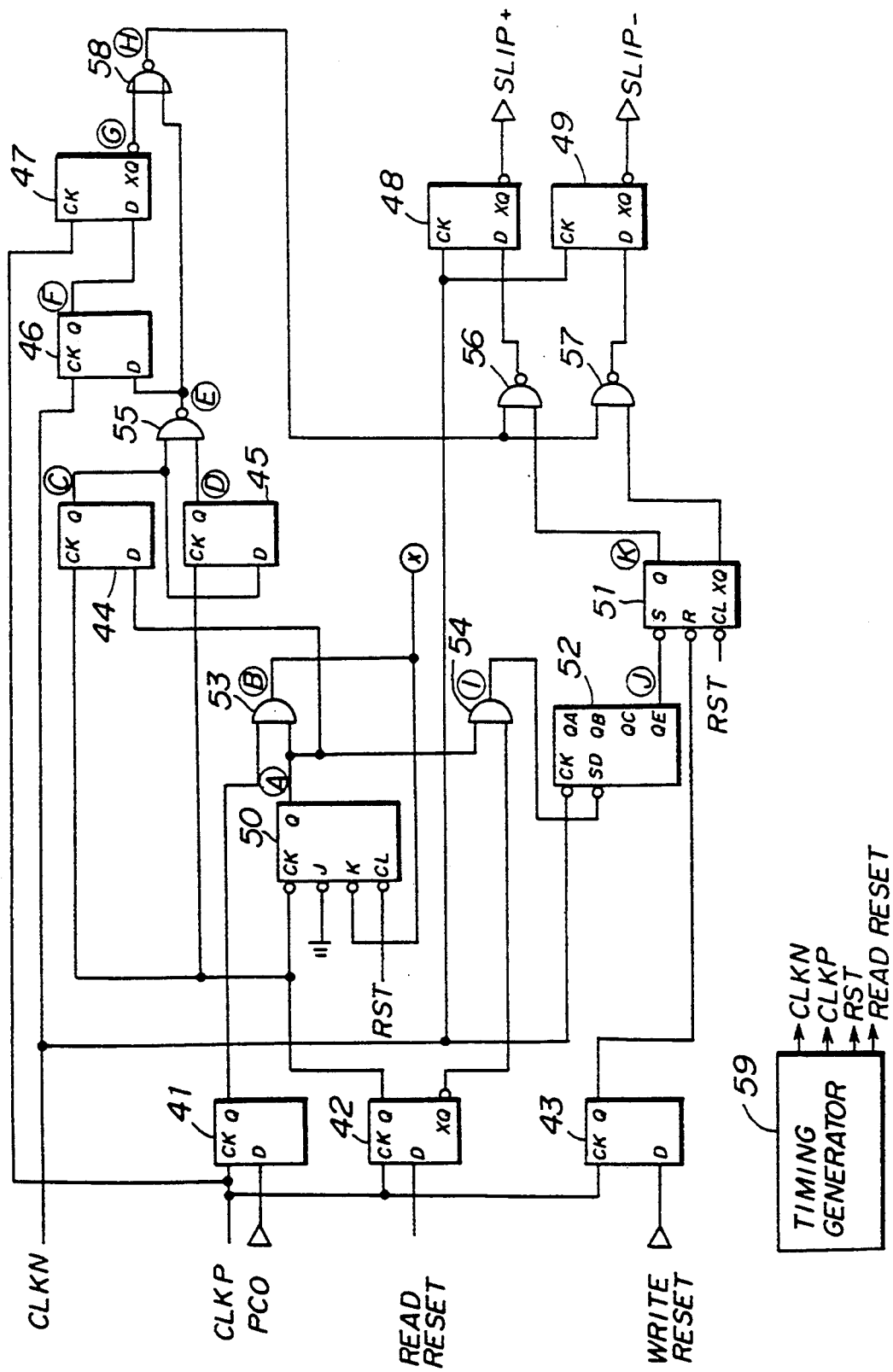
FIGS. 6, 7A, 7B, 8 and 9 are diagrams illustrating a detailed configuration of the structure shown in FIGS. 4 and 5.

FIG. 6 is a circuit diagram of the slip signal generator 13 of the read controller 12 shown in FIG. 4. The slip signal generator 13 in FIG. 6 is composed of D-type flip-flops 41–49, a JK-type flip-flop 50, an RS-type flip-flop 51, a counter 52, AND gates 53 and 54, NAND gates 55–57 and a NOR gate 58. A timing generator 59 is provided in the read controller 12.

Figure 7A:
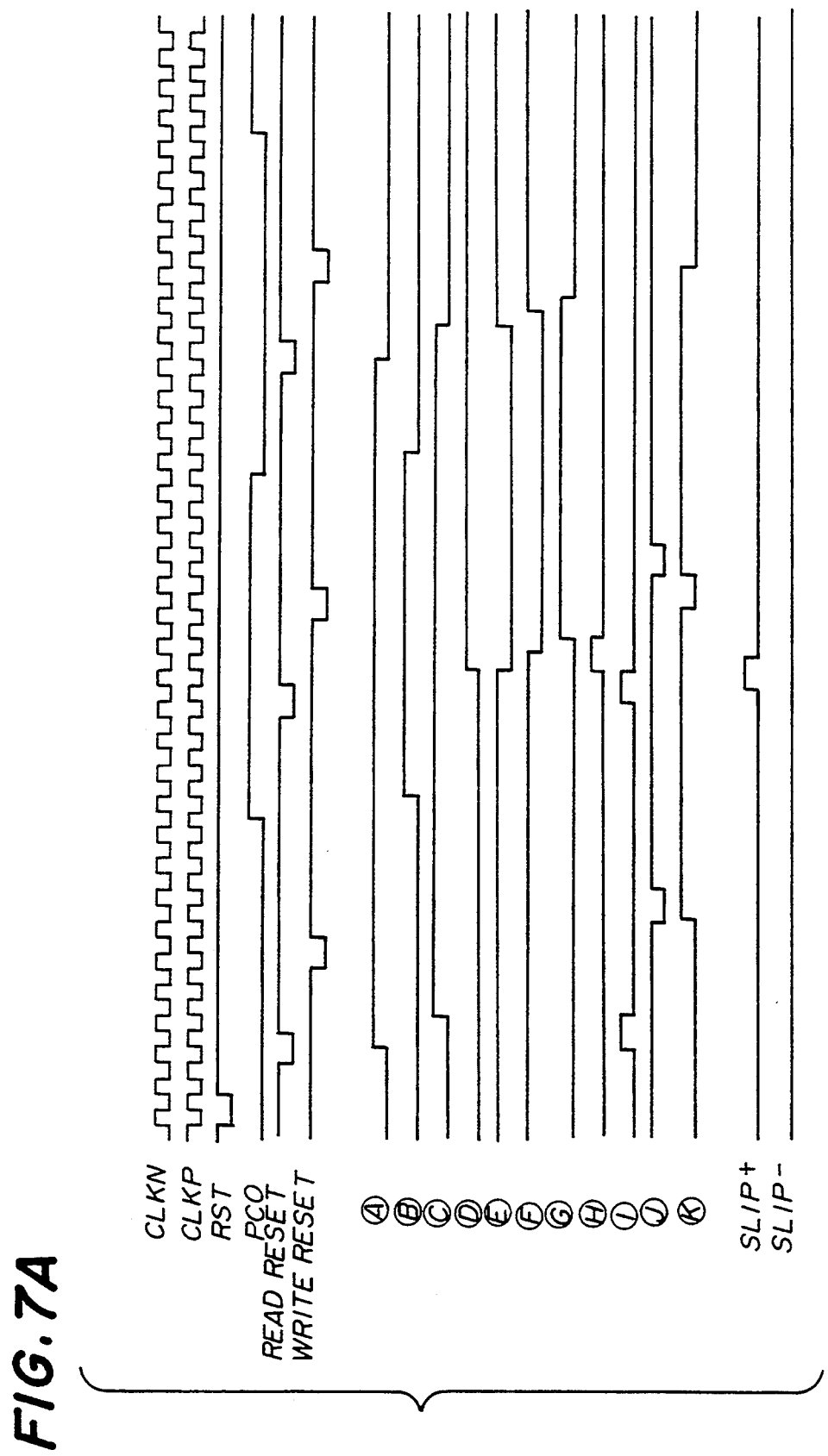
Figure 7B:
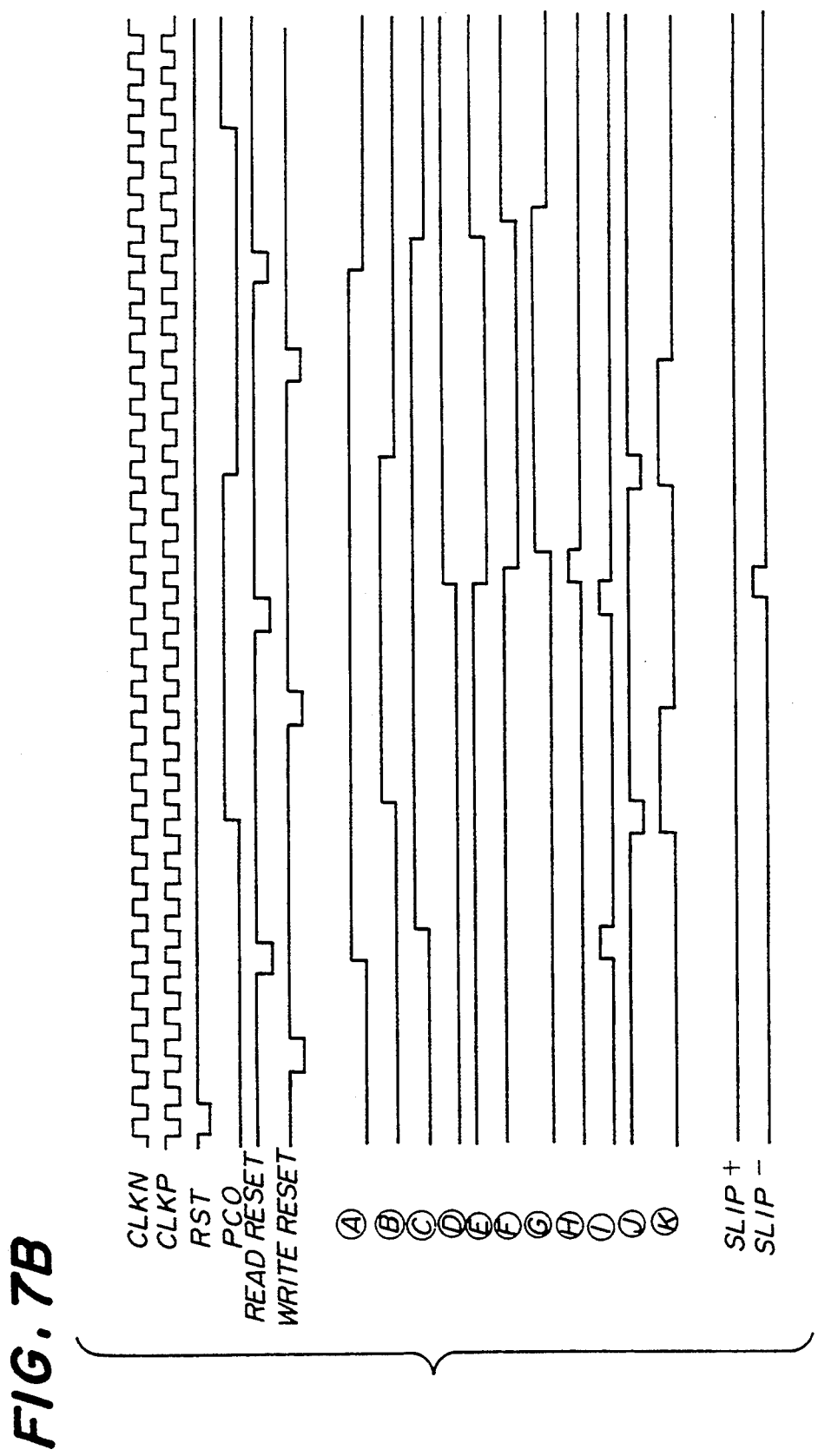

FIGS. 7A and 7B respectively illustrate the operation of the slip signal generator 13 shown in FIG. 6. FIG. 7A illustrates the operation of the slip signal generator 13 when the slip signal SLIP+ is generated, and FIG. 7B illustrates the operation thereof when the slip signal SLIP+ is generated.

Turning to FIG. 6, the PCO signal supplied from the elastic store memory 10 (FIG. 4) is input to the terminal D of the flip-flop 41. The read reset signal generated by the timing generator 59 is input to the terminal D of the flip-flop 42. The write reset signal generated by the write controller 18 (FIG. 5) is applied to the terminal D of the flip-flop 43. The flip-flops 41–43 operate in synchronism with a clock signal CLKP generated by the timing generator 59. An output signal drawn from the terminal Q of the flip-flop 41 is sent to the AND gate 53. An output signal from the terminal Q of the flip-flop 42 is sent to the clock terminals CK of the flip-flops 44, 45 and 50. An output signal from the terminal xQ ($\overline{Q}$) of the flip-flop 42 is inverted and input to the AND gate 54. An output signal from the terminal Q of the flip-flop 43 is applied to the reset terminal R of the flip-flop 51. The terminal J of the flip-flop 50 is grounded, and the clear terminal CL thereof is supplied with a reset signal RST generated by the timing generator 59.

An output signal from the terminal Q of the flip-flop 50 is input to the D terminal of the flip-flop 44 and the AND gate 54. The output terminal of the AND gate 53 is connected to the K terminal of the flip-flop 50. The output terminal of the AND gate 54 is connected to a data terminal SD of the counter 52. An output signal drawn from a terminal $Q_D$ of the timing controller 52 is sent to the set terminal S of the flip-flop 51. The reset signal RST generated by the timing generator 59 is applied to the clear terminal CL of the flip-flop 51. The terminal Q of the flip-flop 51 is connected to the NAND gate 56, and the terminal xQ thereof is connected to the NAND gate 57.

The terminal Q of the flip-flop 44 is connected to the NAND gate 55 and the terminal D of the flip flop 45. The terminal Q of the flip-flop 45 is connected to the NAND gate 55. An output signal of the NAND gate 55 is sent to the terminal D of the flip-flop 46 and the NOR gate 58. The terminal Q of the flip-flop 46 is connected to the terminal D of the flip-flop 47. An output signal at the terminal xQ of the flip-flop 47 is connected to the NOR gate 58. A clock signal CLKN which is generated by the timing generator 59 and which is an inverted version of the clock signal CLKP (FIG. 7A) is applied to the clock terminal CK of the flip-flop 46. The clock terminal CK of the flip-flop 47 is supplied with the clock signal CLKP. An output signal of the NOR gate 58 is sent to the NAND gates 56 and 57. The output terminal of the NAND gate 56 is connected to the terminal D of the flip-flop 48. The output terminal of the NAND gate 57 is connected to the terminal D of the flip-flop 49. The flip-flops 48 and 49 operate in synchronism with the clock signal CLKN. The slip signal SLIP+ is output from the terminal xQ of the flip-flop 48, and the slip signal SLIP− is output from the terminal xQ of the flip-flop 49.

The PCO check circuit 22 shown in FIG. 5 corresponds to the flip-flops 41 and 50 and the AND gate 53. The PCO slip condition circuit 24 corresponds to the flip-flops 44–47 and the NOR gate 58. The detector 23 corresponds to the flip-flops 42, 43 and 51 and the counter 52. The slip signal generator 25 corresponds to the NAND gates 56 and 57 and the flip-flops 48 and 49.

When the read reset signal precedes the write reset signal, the slip signal generator 13 operates, as shown in FIG. 7A. It will be noted that Ⓐ-Ⓚ of FIG. 7A illustrates the waveforms of signals obtained at nodes (A)-(K) shown in FIG. 6. When the write reset signal precedes the read reset signal, the slip signal generator 13 shown in FIG. 6 operates, as indicated in FIG. 7B.

Figure 8:
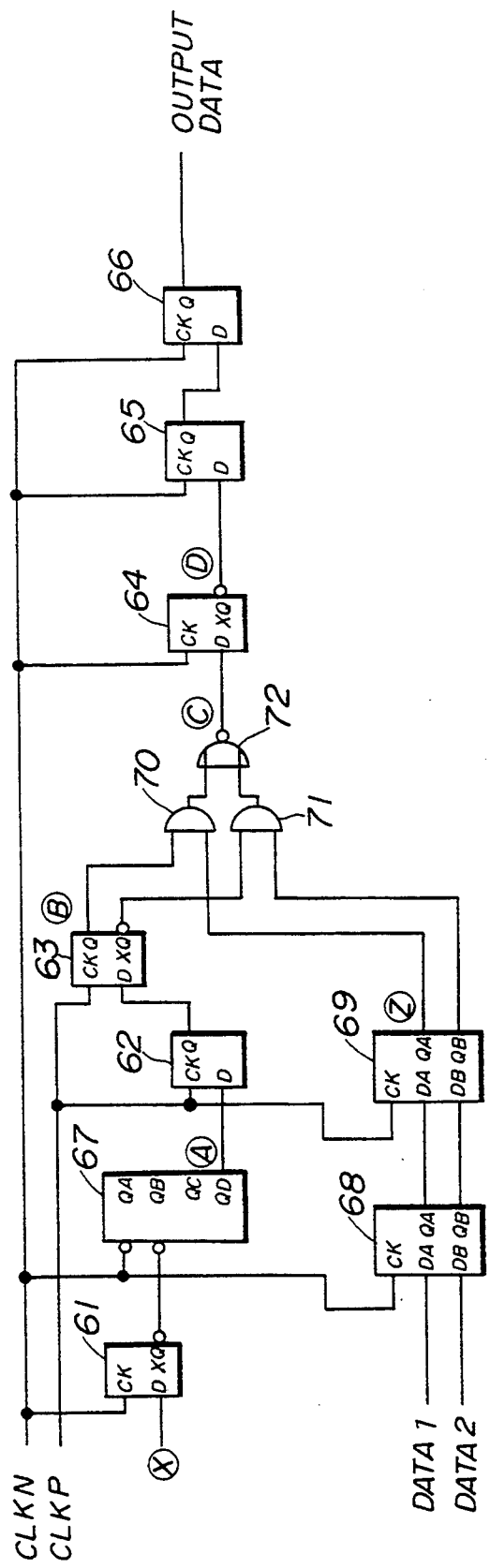

FIG. 8 is a circuit diagram of the selector 14 and the selector controller 15 shown in FIG. 4. The circuit shown in FIG. 8 also corresponds to the readout data selecting circuit 26 shown in FIG. 5. The selector 14 and the selector controller 15, or the readout data selecting circuit 26 is made up of D-type flip-flops 61-66, a counter 67, latch circuits 68 and 69, AND gates 70 and 71 and a NOR gate 72. The terminal D of the flip-flop 61 is connected to the output terminal of the AND gate 53 shown in FIG. 6. The terminal xQ of the flip-flop 61 is connected to the counter 67. A terminal $Q_D$ of the counter 67 is connected to the terminal D of the flip-flop 62, the terminal Q of which is connected to the terminal D of the flip-flop 63. Readout data 1 and 2 which are respectively supplied from the elastic store memories 10 and 11 (FIG. 4) are applied to data terminals DA and DB of the latch circuit 68. Output terminals QA and QB of the latch circuit 68 are connected to data terminals DA and DB of the latch circuit 69. Output terminals QA and QB of the latch circuit 69 are connected to the AND gates 70 and 71, respectively. The terminals Q and xQ of the flip-flop 63 are connected to the AND gates 70 and 71. The output terminals of the AND gates 70 and 71 are connected to the NOR gate 72. The output terminal of the NOR gate 72 is connected to the terminal D of the flip-flop 64. The terminal xQ of the flip-flop 64 is connected to the terminal D of the flip-flop 65, the terminal Q of which is connected to the terminal D of the flip-flop 66. The selected readout data is drawn from the terminal Q of the flip-flop 66. The flip-flops 61 and 64-66 and the latch circuit 68 operate in synchronism with the clock signal CLKN. The flip-flops 62 and 63 and the latch circuit 69 operate in synchronism with the clock signal CLKP.

Figure 9:
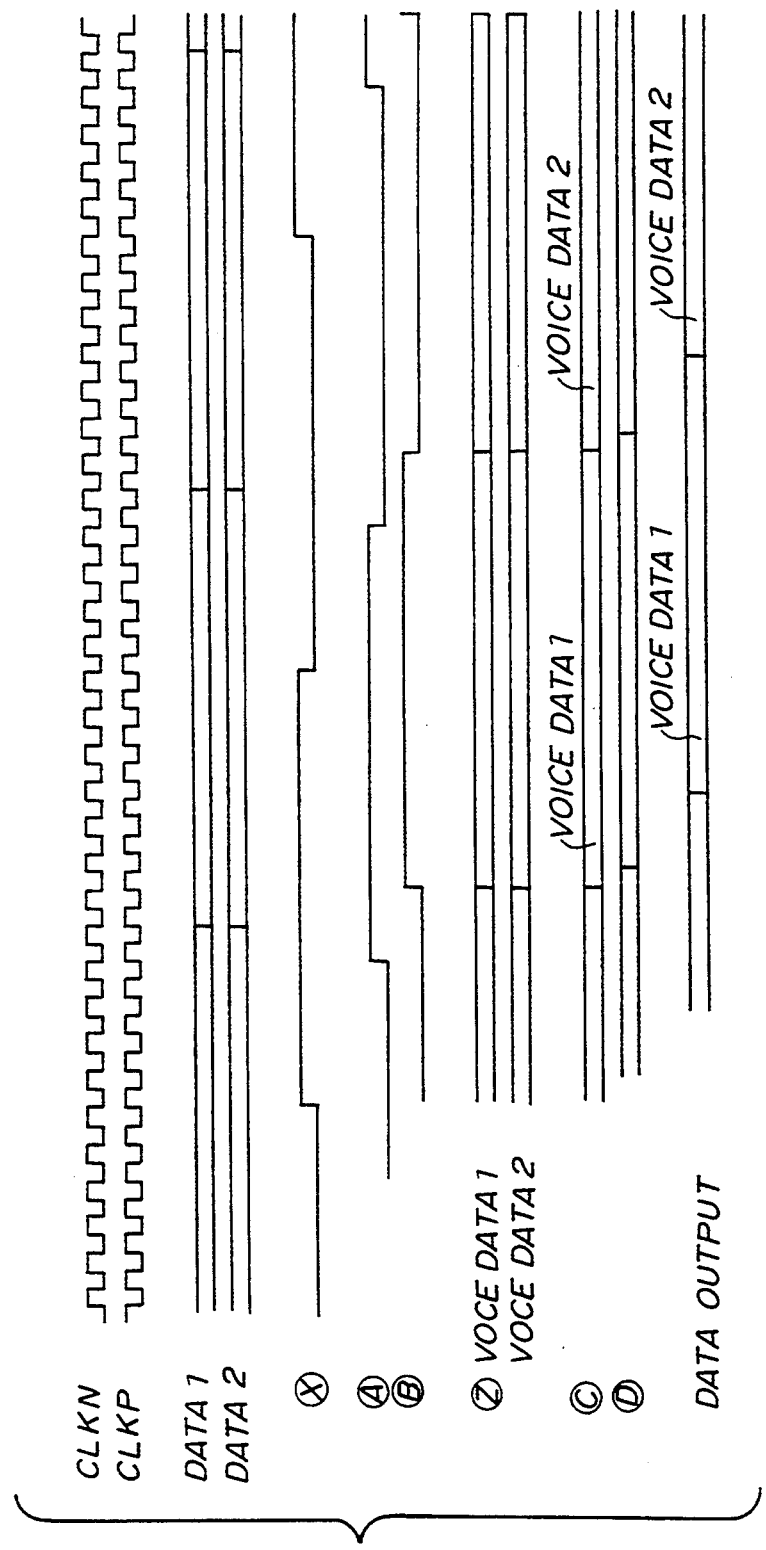

The circuit shown in FIG. 8 operates as shown in FIG. 9. (A)-(D) and (Z) of FIG. 9 show waveforms of signals obtained at nodes (A)-(D) and (Z) of FIG. 8.

When data to be transmitted is voice data, a destination terminal can use data together with the slip signal as it is. This is because even if voice data has a little error, such an error does not appear in an analog signal reproduced by the voice data. On the other hand, when data to be transmitted is control data, every bit of the data is very important and must be transmitted correctly. In this case, if the slip signal SLIP— is generated, the destination terminal does not input the data transmitted together with the slip signal SLIP—.

The present invention is not limited to the specifically described embodiments, and various variations and modifications may be made without departing from the scope of the present invention.

What is claimed is:

1. An elastic store memory circuit supplied with input data, comprising:
   a first elastic store memory;
   a second elastic store memory, the input data being alternately written into said first and second elastic store memories, the input data being read out from said first and second elastic store memories at the same time, one of said first and second elastic memories generating a phase comparison signal when a phase difference between a write timing and a read timing is within a predetermined phase range, the input data being written into and read out from said first and second elastic store memories at said write timing and said read timing, respectively;
   selecting means including a selector coupled to data outputs of said first and second elastic store memories, for selecting one of the input data read out from said first elastic store memory and the input data read out from said second elastic store memory; and
   slip signal generating means, coupled to said one of said first and second elastic store memories, for generating a slip signal based on a write reset timing at which a write address of said one of said first and second elastic store memories is reset, a read reset timing at which a read address for both of said first and second elastic store memories is reset, and said phase comparison signal,
   said slip signal indicating which one of said write reset timing and said read reset timing precedes the other one,
   said slip signal including a first slip signal which indicates that identical input data is output from said selecting means twice, and a second slip signal which indicates that a portion of the input data is lost.

2. An elastic store memory circuit as claimed in claim 1, wherein:
   said slip signal generating means comprises means for generating the first slip signal and the second slip signal,
   said first slip signal indicates that said read reset timing precedes said write reset timing, and
   said second slip signal indicates that said write reset timing precedes said read reset timing.

3. An elastic store memory circuit as claimed in claim 1, wherein said selecting means comprises:
   a selector which selects at least one of said input data read out from said first elastic store memory and said input data read out from said second elastic store memory in accordance with a select signal; and
   selector control means, coupled to said selector and at least one of said first and second elastic store memories, for generating the select signal from said phase comparison signal generated and output by said at least one of said first and second elastic store memories.

4. An elastic store memory circuit as claimed in claim 3, wherein said selector control means generates said select signal which instructs said selector to output identical input data twice.

5. An elastic store memory circuit as claimed in claim 1,
   wherein said elastic store memory circuit has a read reset signal and a write reset signal, and
   wherein said slip signal generating means comprises a set-reset flip-flop having a set terminal receiving the read reset signal defining said read reset timing and a reset terminal receiving the write reset signal defining said write reset timing.

6. An elastic store memory as claimed in claim 1,
   wherein the input data includes a plurality of predetermined frames, and
   wherein said input data is alternately written into said first and second elastic store memories for every one of the plurality of predetermined frames having a predetermined data length.

7. An elastic store memory circuit as claimed in claim 1, wherein each of said first and second elastic store memories generates said phase comparison signal for every one of the plurality of predetermined frames.

8. An elastic store memory circuit as claimed in claim 7, wherein said slip signal generating means generates said slip signal when said one of the first and second elastic store memories generates said phase comparison signal.

9. An elastic store memory circuit as claimed in claim 1,
wherein said elastic store memory circuit is coupled to a transmission line, and
wherein the input data is read out from said first and second elastic store memories at a transmission bit rate at which said input data is carried on the transmission line.

10. An elastic store memory circuit as claimed in claim 1, wherein said predetermined phase range includes $(n-1)$ bits before said write reset timing and $(n+1)$ bits after said write reset timing, and n is an arbitrary integer.

11. A slip signal generator supplied with a write reset signal, a read reset signal, and a phase comparison signal generated by one of first and second elastic store memories which store input data, comprising:
a detector for comparing the read and write reset signals, the read reset signal being used to reset a read address of both of the first and second elastic store memories, and the write reset signal being used to reset one of the first and second elastic store memories, and for generating an output signal indicative of first and second conditions, the first condition existing when the read reset signal precedes the write reset signal, and the second condition existing when the write reset signal precedes the read reset signal; and
a slip signal generator coupled to said detector, for receiving the output signal and the phase comparison signal, for generating a slip positive signal when the first condition exists and when the phase comparison signal is activated, and for generating a slip negative signal when the second condition exists and when the phase comparison signal is activated, the slip positive signal indicating that input data stored in the one of the first and second elastic store memories was read twice, and the slip negative signal indicating that input data stored in the one of the first and second elastic store memories was lost,
the input data being written into the first and second elastic store memories in alternation, and
the input data being read from the first and second elastic store memories simultaneously.

12. A method for indicating reading errors of input data stored in first and second elastic store memories, comprising the steps of:
a) comparing read and write reset signals, the read reset signal being used to reset a read address and the write reset signal being used to reset a write address for one of the first and second elastic store memories;
b) determining whether the read reset signal precedes the write reset signal;
c) determining whether a phase comparison signal is activated, the phase comparison signal being generated by the one of the first and second elastic store memories in response to a condition in which a write timing of input data is within a read timing of the input data for the one of the first and second elastic store memories;
d) generating a first slip signal indicating that input data stored in the one of the first and second elastic store memories was read twice when the read reset signal precedes the write reset signal and the phase comparison signal is activated; and
e) generating a second slip signal indicating that input data stored in the one of the first and second elastic store memories was lost when the write reset signal precedes the read reset signal and the phase comparison signal is activated.

* * * * *